United States Patent
Waddan et al.

[15] 3,697,534
[45] Oct. 10, 1972

[54] PREPARATION OF 2,2'-BIPYRIDYL

[72] Inventors: Dhafir Yusuf Waddan; Derek Williams, both of Manchester, England

[73] Assignee: Imperial Chemical Industries Limited, London, England

[22] Filed: Oct. 1, 1969

[21] Appl. No.: 862,944

[30] Foreign Application Priority Data

Oct. 3, 1968 Great Britain..........47,023/68

[52] U.S. Cl. ..............................260/296 D
[51] Int. Cl. ...............................C07d 31/42
[58] Field of Search................260/296 D

[56] References Cited

OTHER PUBLICATIONS

Gaylord, Reduction With Complex Metal Halides, Interscience Publishers Pages 1027, 1028, 1033– 1035, (1956) QD63 R463 C.4

Fieser and Fieser, Reagents For Organic Synthesis, John Wiley & Sons Publishers, Page 1170, (1967) QD262 F5 C.4

Primary Examiner—Alan L. Rotman
Attorney—Cushman, Darby & Cushman

[57] ABSTRACT

Pyridines are converted into 2,2'-bipyridyls by treatment with Ziegler catalysts.

4 Claims, No Drawings

PREPARATION OF 2,2'-BIPYRIDYL

This invention relates to a process for the preparation from pyridines of 2,2'-bipyridyls, useful as intermediates for the manufacture of herbicides.

According to the invention there is provided a process for the preparation of 2,2'-bipyridyls which comprises treating a pyridine with a Ziegler catalyst as hereinafter defined.

As pyridines there may be used pyridine itself or pyridines containing one or more alkyl groups containing not more than four alkyl carbon atoms altogether and having at least one free position adjacent to the nitrogen atom. The use of alkyl pyridines affords the corresponding alkylated 2,2'-bipyridyls. Also other heterocyclic compounds containing the pyridine nucleus such as quinoline, isoquinoline, lepidine, phenanthridine, acridine or nicotine, may be used. The expression Ziegler catalyst is well-known in the art and indicates a combination of compounds from each two classes hereinafter called Classes A and B respectively and optionally at least one compound from a third class hereinafter called Class C. These classes are as follows:

CLASS A

Transition metal compounds. The term "transition metal" means a metal which in elementary form has an incomplete shell of $d$ or $f$ electrons. These are the elements of atomic numbers 21–29, 39–47 and 71–79 inclusive. Of these the preferred metals are cobalt, palladium, ruthenium, platinum, and especially nickel. Compounds of these metals which may be used in the combination include oxides, hydroxides, alkoxides, salts (particularly organic acid salts e.g., acetates, propionates, ectoates, benzoates or naphthenates), chelating salts such as acetylacetonates, complexes containing pi- or sigma-bonded ligands or allyl groups attached to metal (e.g., bis-cyclopentadienyl and carbonyl complexes) and complexes of zero valent metals with olefinic and other donors, e.g. amines, nitriles, ethers, thiocompounds, phosphines and phosphites.

CLASS B

Certain compounds which have a reducing action on the metal compounds of Class A including metal alkyls or aryls, especially those in which an alkyl group is directly attached to aluminum, e.g., triethyl-, tripropyl and triisobutylaluminum, monochlorodiethylaluminum, dichloroethylaluminum, ethoxydiethylaluminum, diisobutylaluminum hydride and the etherides of these compounds. Other compounds in Class B are organic compounds of aluminum e.g., aluminum salts of organic acids, organic compounds of lithium, zinc or magnesium (e.g., lithium ethyl, zinc diethyl and magnesium ethyl chloride), compounds such as sodium bis(ethoxymethoxy) aluminum hydride, and hydrides of alkali metals e.g. sodium hydride or sodium borohydride. Preferred components are the aluminum trialkyls and aluminum ethyldiacetate, aluminum diethylacetate, aluminum triacetate and aluminum diethylacetylacetonate and similar aluminum compounds. Mixtures of two or more compounds from Class B may be used in the catalyst compositions.

CLASS C

Ligands which can co-ordinate with the combination of compounds of Classes A and B. These include water, ethers, e.g., diethyl ether and tetrahydrofuran; alcohols e.g., ethyl alcohol, methyl alcohol, butyl alcohol, phenols, e.g., phenol, p-cresol; amines, e.g., triethylamine, pyridine; phosphines e.g., triphenylphosphine, 1,2-bis(diphenylphosphino)ethane; sulphides, e.g., thiodioxane and nitriles e.g., acetonitrile, benzonitrile.

Ziegler catalysts are made by bringing the components from Classes A and B together, optionally in the presence of a solvent for example a hydrocarbon, e.g., cyclohexane or benzene, or an ether, e.g., tetrahydrofuran and allowing interaction to take place, either with free evolution of heat or with cooling. The word "combination" implies only that the components from Classes A and B are materials used to make the catalyst and carries no implication regarding the chemical structure of the catalyst. The optional component from Class C may be added before or after the components from Classes A and B are brought together.

The component from Class A and Class B may suitably be used in a molar ratio of 0.2–10:1, and preferably in a molar ratio of about 1:2. The components from Class C, when used, may be present in molar ratio with respect to the component from Class B of 0.2–10:1 and preferably about 1:2.

The process may conveniently be carried out by mixing the solution of Ziegler catalyst, obtained by combination of the components from Classes A and B together, with a pyridine, and reacting the mixtures, if necessary at superatmospheric pressure, at a temperature between 0° and 300° preferably at a temperature between 100° and 200° C. The bipyridyl may be isolated by removal of unreacted pyridine by distillation and either further distillation of the high boiling residue, or extraction of the residue with a solvent such as petroleum ether. Unreacted pyridine can be recovered by distillation and reused in the process. The reaction may be carried out batchwise or continuously.

If desired the process may be carried out under an atmosphere of hydrogen.

The invention is illustrated but not limited by the following examples in which all parts and percentages are by weight unless otherwise stated.

EXAMPLE 1

Aluminumtriisobutyl (1.1 ml. of 50 percent solution in benzene) is added to 0.1877 g. of nickel acetate followed by 10 ml. of pyridine. The mixture is kept at 165° C. for 8 hours. 2,2'-bipyridyl is isolated by removal of unreacted pyridine by distillation and further distillation of 2,2'-bipyridyl from the residue at a boiling point of 269°–70° C. The sample of bipyridyl thus obtained (0.35 g.) had a melting point of 69° C.

EXAMPLE 2

Aluminumtriisobutyl (3.7 ml. of 50 percent solution in benzene) is added to 0.65 g. of nickel acetate followed by 15 ml. of pyridine. The mixture is charged to an autoclave and kept at 140° C. for 6 hours under a pressure of 30 p.s.i. of hydrogen. Bipyridyl (0.5 g.) is isolated by the procedure described in Example 1.

EXAMPLE 3 aluminumtriisobutyl (3.4 ml. of 50 percent solution in benzene) is added to 0.596 g. of nickel acetate followed by 15 ml. of pyridine. The mixture is kept at 150° C., for 6 hours. Bipyridyl is isolated by the procedure described in Example 1.

EXAMPLE 4

Aluminumtriisobutyl (4 ml. of 50 percent solution in n-hexane) is added to 0.855 g. of palladium acetate followed by 10 ml. of pyridine. The mixture is kept at 115° C. for 4 hours. Bipyridyl (0.6 g.) is isolated by the procedure described in Example 1.

EXAMPLE 5

Aluminumtriethyl (0.44 ml. of 50 percent solution in benzene) is added to nickel acetate (0.137 g.) followed by 0.1 g. of aluminum diacetate and 20 ml. of pyridine. The mixture is kept at 115° C. for 70 hours. 0.58 g. of 2,2'-bipyridyl is obtained. The unreacted pyridine is recovered.

EXAMPLE 6

Aluminumtriethyl (0.33 ml. of 50 percent solution in benzene) is added to 0.1 g. of nickel acetate followed by 0.2 g. of ethylaluminum diacetate and 20 ml. of pyridine. The mixture is kept at 115° C. for 160 hours. 0.95 g. of 2,2'-bipyridyl is obtained. The unreacted pyridine is recovered.

EXAMPLE 7

Aluminumtriethyl (0.33 ml. of 50 percent solution in benzene) is added to 0.1 g. of nickel acetate followed by 0.2 g. of ethylaluminum dioctoate and 20 ml. of pyridine. The mixture is kept at 115° C. for 20 hours. 0.54 g. of 2,2'-bipyridyl is obtained. The unreacted pyridine is recovered.

EXAMPLE 8

Aluminumtriisopropyl (3.65 ml. of 50 percent solution in benzene) is added to 0.6504 g. of nickel acetate followed by 15 ml. of pyridine. The mixture is kept at 140° C. for 6 hours under an initial pressure of 30 lb./in$^2$ of hydrogen. 2,2'-Bipyridyl (0.5 g.) is isolated by the procedure described in Example 1.

EXAMPLE 9

Aluminumtriisobutyl (5.1 ml. of 50 percent solution in n-hexane) is added to 0.8980 g. of nickel acetate followed by 0.5 ml. of triethylamine and 15 ml. of pyridine. The mixture is kept at 115° C. for 5 hours. 0.144 g. of 2,2'-bipyridyl is obtained.

EXAMPLE 10

Aluminumtriethyl (2.6 ml. 50 percent solution in n-hexane) is added to 0.8514 g. of nickel acetate followed by 1 ml. of tetrahydrofuran and 5 ml. of pyridine. The mixture is kept at 150° C. for 6 hours. 0.047 g. of 2,2'-bipyridyl is obtained.

EXAMPLE 11 n-Butylbromide (1.3 ml. in 1 ml. ether) is added to magnesium (0.3 g. in 5 ml. ether). 0.4560 g. of nickel acetate is added to this mixture followed by 10 ml. of pyridine. The mixture is kept at 115° C. for 4 hours. The presence of 2,2'-bipyridyl in the product was confirmed by U.V. spectrometry.

EXAMPLE 12

Aluminumtriisobutyl (4.5 ml. of 50 percent solution in n-hexane) is added to 1.0323 g. of cobaltous acetate followed by 15 ml. of pyridine. The mixture is kept at 115° C. for 3½ hours. U.V. analysis showed the presence of 2,2'-bipyridyl in the reaction product.

EXAMPLE 13

Aluminumtriisobutyl (4 ml. of 50 percent solution in n-hexane) is added to 0.8551 g. of palladium acetate followed by 10 ml. of pyridine. The mixture is kept at 115° C. for 4 hours. 0.4 g. of 2,2'-bipyridyl is obtained. The unreacted pyridine is recovered.

EXAMPLE 14

Sodium dihydrobis(2-methoxyethoxy)aluminate (1.3 ml. of 70 percent solution in benzene) is added to 0.4032 g. of nickel acetate followed by 10 ml. of pyridine. The mixture is kept at 115° C. for 23 hours. 0.226 g. of 2,2'-bipyridyl is obtained.

EXAMPLE 15

Sodium dihydrobis(2-methoxyethoxy)aluminate (0.8 ml. of 70 percent solution in benzene) is added to 0.2362 g. of nickel acetate followed by 20 ml. of pyridine. The mixture is kept at 115° C. for 24 hours in a hydrogen atmosphere. 0.168 g. of 2,2'-bipyridyl is obtained.

EXAMPLE 16

Lithium aluminum hydride (0.2 g. in ether) is added to 0.34 g. of nickel acetate followed by 20 ml. of pyridine. The mixture is kept at 115° C. for 27 hours. 0.11 g. of 2,2'-bipyridyl is obtained.

EXAMPLE 17

0.7 ml. of isobutanol is added to aluminumtriisobutyl (3.7 ml. of 50 percent solution in n-hexane). The resulting aluminum isobutoxydiisobutyl is added to 0.649 g. of nickel acetate followed by 20 ml. of pyridine. The mixture is kept at 115° C. for 7 hours. 0.24 g. of 2,2'-bipyridyl is obtained.

EXAMPLE 18

Aluminumtriethyl (0.7 ml. in 50 percent solution of n-hexane) is added to 0.2874 g. of nickel acetate followed by 20 ml. of pyridine. The mixture is kept at 115° C. for 7 hours in an atmosphere of hydrogen. 0.177 g. of 2,2'-bipyridyl is obtained.

EXAMPLE 19

Aluminumtriisobutyl (1.6 ml. in 50 percent solution of n-hexane) is added to a mixture of 0.5127 g. of nickel acetylacetonate and 0.4 g. of cycloocta-1,5-diene in 20 ml. of ether. The ether is removed from the precipitate of biscycloocta-1,5dienylnickel and 10 ml. of pyridine are added. The mixture is kept at 115° C. for 53 hours. 0.10 g. of 2,2'-bipyridyl is obtained.

EXAMPLE 20

Aluminumtriethyl (0.2 ml. 50 percent solution in toluene) is added to nickel benzoate (0.1075 g.) followed by aluminum ethyldipropionate (0.24 g. in 3 ml. of toluene) and pyridine (20 ml.). The mixture is kept at 115° C. for 22 hours. 0.2 g. of 2,2'-bipyridyl is obtained.

EXAMPLE 21

Aluminumtriethyl (0.163 ml. is added to nickelacetate (0.1008 g. in 0.5 ml. of toluene) followed by aluminum ethyl bis(phenylacetate) (0.4 g. in 0.5 ml. of toluene) and pyridine (20 ml). The mixture is kept at 115° C. for 45 hours. 0.25 g. of 2,2'-bipyridyl is obtained.

EXAMPLE 22

Aluminumtriethyl (0.165 ml.) is added to nickelacetate (0.1001 g. in 0.25 ml. of toluene) followed by aluminum ethyldibenzoate (0.31 g. in 0.5 ml. of toluene) and pyridine (20 ml.). The mixtures is kept at 115° C. for 45 hours. 0.15 g. of 2,2'-bipyridyl is obtained.

EXAMPLE 23

Aluminumtriethyl (0.34 ml. of 50 percent solution in toluene is added to nickelacetate (0.1038 g.) and γ-picoline (0.1 ml.) followed by pyridine (20 ml.). The mixture is kept at 115° C. for 18 hours. 0.8 g. of 2,2'-bipyridyl is obtained.

EXAMPLE 24

Aluminumtriethyl (0.35 ml. of 50 percent solution in toluene) is added to nickel acetate (0.1101 g.) and tetrahydrofuran (1 ml.) followed by aluminum ethyldiacetate (0.2g.) and pyridine (20 ml.) The mixture is kept at reflux temperature for 48 hours. 0.008 g. of 2,2'-bipyridyl is obtained.

EXAMPLE 25

Aluminumtriethyl (3.23 ml. of 50 percent solution in toluene) is added to nickelacetate (1.00 g.) followed by aluminum ethyldipropionate (3.84 g.) and pyridine (200 ml.). The mixture is kept at 115° C. for 186 hours. 9.3 g. of 2,2'-bipyridyl is isolated by distillation.

EXAMPLE 26

Aluminumtriisobutyl (2 ml. of 50 percent solution in n-hexane) is added to chromium diacetate (0.336 g.) followed by pyridine (20 ml.) The mixture is kept at 115° C. for 2½ hours. The presence of 2,2'- -bi-pyridyl is conformed by U.V. spectrometry.

EXAMPLE 27

Aluminumtriethyl (0.33 ml. of 50 percent solution in n-hexane) is added to nickel acetate (0.1007 g.) followed by aluminum ethyl dioctoate (0.2 g.) and pyridine (20 ml.). The mixture is kept at 115° C. for 117 hours. 0.438 g. of 2,2'-bipyridyl is obtained.

EXAMPLE 28

Aluminumtriethyl (0.35 ml. of 50 percent solution in toluene) is added to nickelacetate (0.1089 g.) followed by aluminum ethyl diacetylacetonate (0.45 ml. of 50 percent solution in toluene) and pyridine (20 ml.). The mixtures is kept at 115° C. for 66 hours. 0.264 g. of 2,2'-bipyridyl is obtained.

We claim:

1. A process for the preparation of 2,2'-bipyridyl which consists essentially of treating a pyridine with a Ziegler catalyst which is a combination of (A) a transition metal compound selected from the group consisting of an oxide, hydroxide, alkoxide, carboxylic acid salt and acetylacetonate, carbonyl and bis-cyclopentadienyl complexes of nickel, ruthenium, palladium, platinum, cobalt and chromium and (B) a reducing agent for said compound (A), said agent (B) being selected from the group consisting of aluminum, zinc, magnesium and lithium alkyl compounds in which the alkyl is lower alkyl attached directly to the metal and alkali metal hydrides, at a temperature between 0° C and 300° C.

2. A process as claimed in claim 1 wherein the transition metal compound s nickel, chromium, cobalt or palladous acetate, nickel benzoate or nickel acetylacetonate and the reducing agent is an aluminum trialkyl wherein the alkyl contains up to four carbon atoms.

3. A process as claimed in claim 1 wherein the molar ratio of the transition metal compound to that of the reducing agent is 0.2 - 10 : 1.

4. A process as claimed in claim 1 wherein the Ziegler catalyst contains a ligand for the combination of the transition metal compound and reducing agent, said ligand being selected from the group consisting of water, diethylether, tetrahydrofuran, ethyl alcohol, methyl alcohol, butyl alcohol, phenol, p-cresol, triethylamine, pyridine, triphenylphosphine, 1,2-bis(diphenylphosphino)ethane, thiodioxane, acetonitrile and benzonitrile.

* * * * *